(12) United States Patent
Pan

(10) Patent No.: US 11,099,473 B2
(45) Date of Patent: Aug. 24, 2021

(54) ILLUMINATION SYSTEM AND PROJECTION APPARATUS

(71) Applicant: Coretronic Corporation, Hsin-Chu (TW)

(72) Inventor: Haw-Woei Pan, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/847,685

(22) Filed: Apr. 14, 2020

(65) Prior Publication Data

US 2020/0333698 A1 Oct. 22, 2020

(30) Foreign Application Priority Data

Apr. 16, 2019 (CN) .......................... 201920510370.8

(51) Int. Cl.
*G03B 21/20* (2006.01)
*H04N 9/31* (2006.01)
*G02B 27/09* (2006.01)

(52) U.S. Cl.
CPC ....... *G03B 21/208* (2013.01); *G02B 27/0961* (2013.01); *G03B 21/2013* (2013.01); *G03B 21/2033* (2013.01); *H04N 9/3161* (2013.01); *H04N 9/3164* (2013.01)

(58) Field of Classification Search
CPC .. G03B 21/28; G03B 21/208; G03B 21/2013; G03B 21/2033; G03B 21/2053; G03B 21/2066; H04N 9/315; H04N 9/3132; H04N 9/3152; H04N 9/3161; H04N 9/3164; G02B 27/0927; G02B 27/0946; G02B 27/0961; G02B 27/0966; G02B 27/0994; G02B 27/1026

See application file for complete search history.

(56) References Cited

U.S. PATENT DOCUMENTS

| 6,882,379 | B1 | 4/2005 | Yokoyama et al. | |
|---|---|---|---|---|
| 2006/0050245 | A1* | 3/2006 | Arai | G02B 27/102 353/85 |
| 2007/0121085 | A1* | 5/2007 | Dewald | G02B 26/0833 353/99 |
| 2010/0165307 | A1* | 7/2010 | Mizushima | G02B 26/105 353/98 |

(Continued)

FOREIGN PATENT DOCUMENTS

CN 104049445 12/2016

*Primary Examiner* — Sultan Chowdhury
(74) *Attorney, Agent, or Firm* — JCIPRNET

(57) ABSTRACT

An illumination system including at least one laser light source, at least one light spot shaping element and a light uniforming element is provided. The at least one laser light source emits at least one laser beam. The light spot shaping element is disposed on a transmission path of the at least one laser beam. At least one surface of the light spot shaping element has multiple microstructures, and a shape of an orthogonal projection of each one of the microstructures on a reference plane perpendicular to an optical axis of the light spot shaping element is a rectangle. The light uniforming element is disposed on the transmission path of the laser beam, and the light uniforming element has a rectangular light entering end, wherein an aspect ratio of each microstructure of the light spot shaping element corresponds to an aspect ratio of the rectangular light entering end.

14 Claims, 5 Drawing Sheets

(56) References Cited

U.S. PATENT DOCUMENTS

| | | | | |
|---|---|---|---|---|
| 2013/0250546 A1* | 9/2013 | Hu | ............................ | F21K 9/64 |
| | | | | 362/84 |
| 2013/0258294 A1* | 10/2013 | Kaneda | ................ | G02B 3/0062 |
| | | | | 353/38 |
| 2018/0292663 A1* | 10/2018 | Richards | ............ | G03B 21/2033 |

* cited by examiner

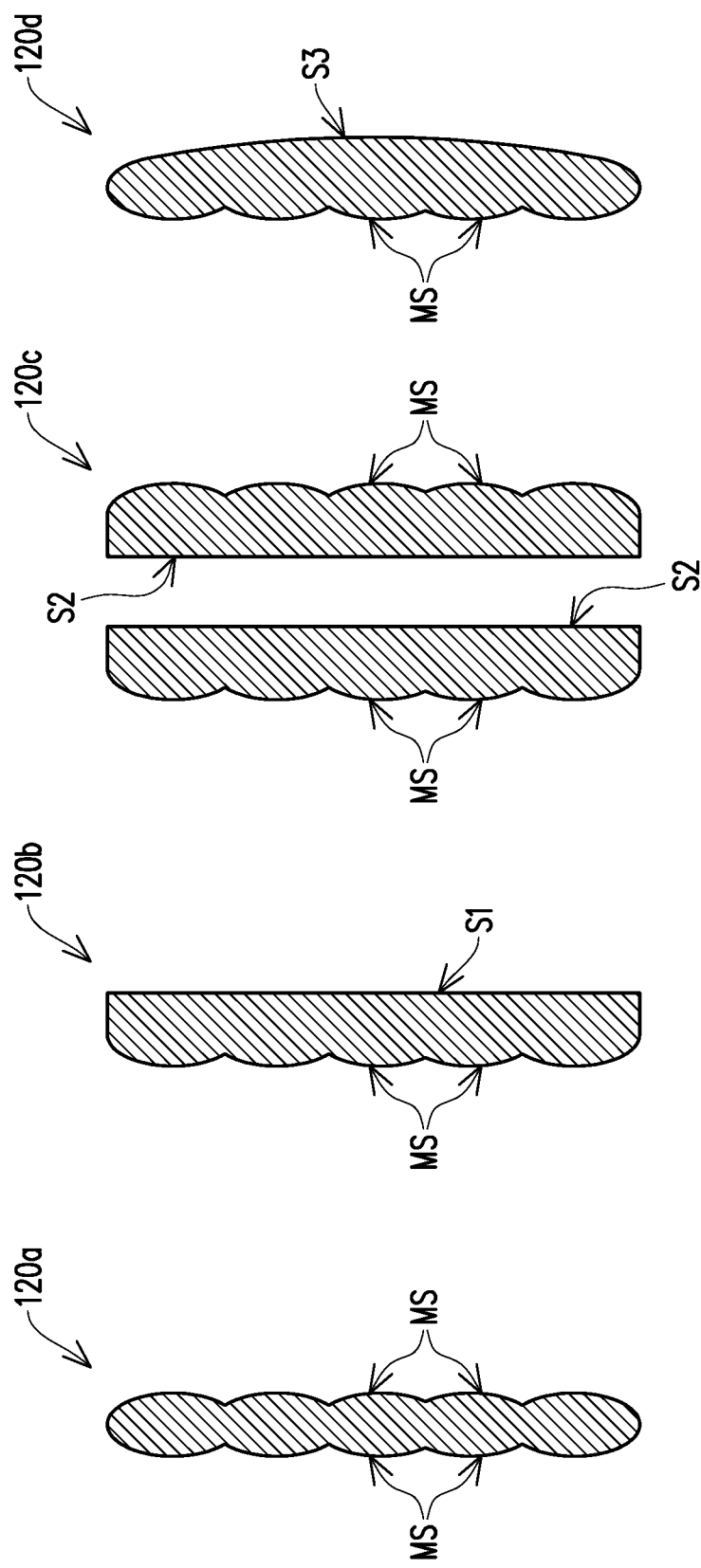

ILLUMINATION SYSTEM AND PROJECTION APPARATUS

CROSS-REFERENCE TO RELATED APPLICATION

This application claims the priority benefit of China application serial no. 201920510370.8, filed on Apr. 16, 2019. The entirety of the above-mentioned patent application is hereby incorporated by reference herein and made a part of this specification.

BACKGROUND

Technical Field

The invention relates to an optical system and an optical device, and particularly relates to an illumination system and a projection apparatus applying the illumination system.

Description of Related Art

As a price of laser diodes gradually decreases, besides that a laser projection apparatus may use a laser light source to excite phosphor to emit light, red, green and blue lasers may also be directly used as illumination light sources of the projection apparatus, and such illumination light source has advantages of high electro-optical conversion efficiency, wide gamut, high color purity and long service life, etc., and the number of the light sources may be adjusted according to a brightness requirement to meet the needs of projectors with different brightness.

However, due to the structure of the laser diode, a light spot of a light beam emitted from a single laser diode presents a shape of an oblong ovate. When the red, green and blue lasers are used as the illumination light sources of the projector, after being received by an optical system, the lasers are converged and form an oblong ovate light spot on a light uniforming element (for example, a light integration rod). However, a range of the oblong ovate light spot may probably exceed a range of an entering end of the light uniforming element, so that a part of the light spot may fall out of the range of the entering end to cause loss of light efficiency.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention is directed to an illumination system and a projection apparatus, which have better optical efficiency.

Other objects and advantages of the invention may be further illustrated by the technical features broadly embodied and described as follows.

In order to achieve one or a portion of or all of the objects or other objects, an embodiment of the invention provides an illumination system including at least one laser light source, at least one light spot shaping element and a light uniforming element. The at least one laser light source is configured to emit at least one laser beam. The at least one light spot shaping element is disposed on a transmission path of the at least one laser beam. At least one surface of the at least one light spot shaping element has a plurality of microstructures, and a shape of an orthogonal projection of each one of the microstructures on a reference plane perpendicular to an optical axis of the at least one light spot shaping element is a rectangle. The light uniforming element is disposed on the transmission path of the at least one laser beam, and the light uniforming element has a rectangular light entering end, wherein an aspect ratio of each one of the microstructures of the at least one light spot shaping element corresponds to an aspect ratio of the rectangular light entering end of the light uniforming element.

In order to achieve one or a portion of or all of the objects or other objects, an embodiment of the invention provides a projection apparatus including the aforementioned illumination system, a light valve and a projection lens. The illumination system is configured to emit an illumination beam. The light valve is disposed on a transmission path of the illumination beam to convert the illumination beam into an image beam. The projection lens is disposed on a transmission path of the image beam.

Based on the above description, in the illumination system and the projection apparatus of the invention, since the shape of the orthogonal projection of each one of the microstructures of the at least one light spot shaping element on the reference plane perpendicular to the optical axis of the at least one light spot shaping element is a rectangle, and the aspect ratio of each one of the microstructures of the at least one light spot shaping element corresponds to the aspect ratio of the rectangular light entering end of the light uniforming element, the at least one light spot shaping element may be used to make a light spot shape of the at least one laser beam correspond to a shape of the rectangular light entering end of the light uniforming element, so as to improve shape matching between the light spot and the rectangular light entering end, which may improve light collecting efficiency and reduce the loss of light efficiency. Therefore, the illumination system and the projection apparatus of the embodiments of the invention have better optical efficiency.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 4A to FIG. 4D are cross-sectional views of light spot shaping elements according to some embodiments of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
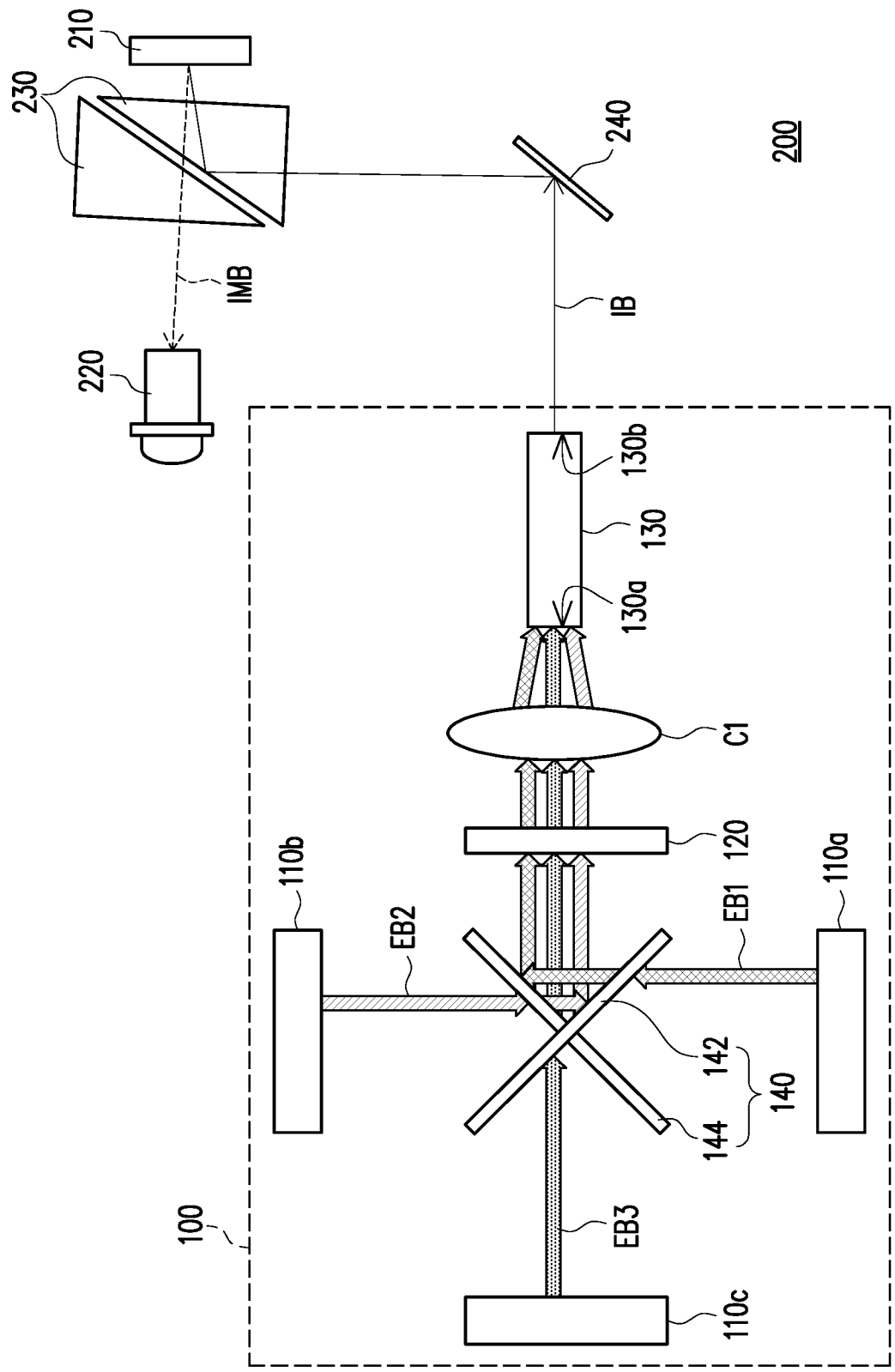
FIG. 1 is a schematic diagram of a projection apparatus according to a first embodiment of the invention.
Figures 2, 3:
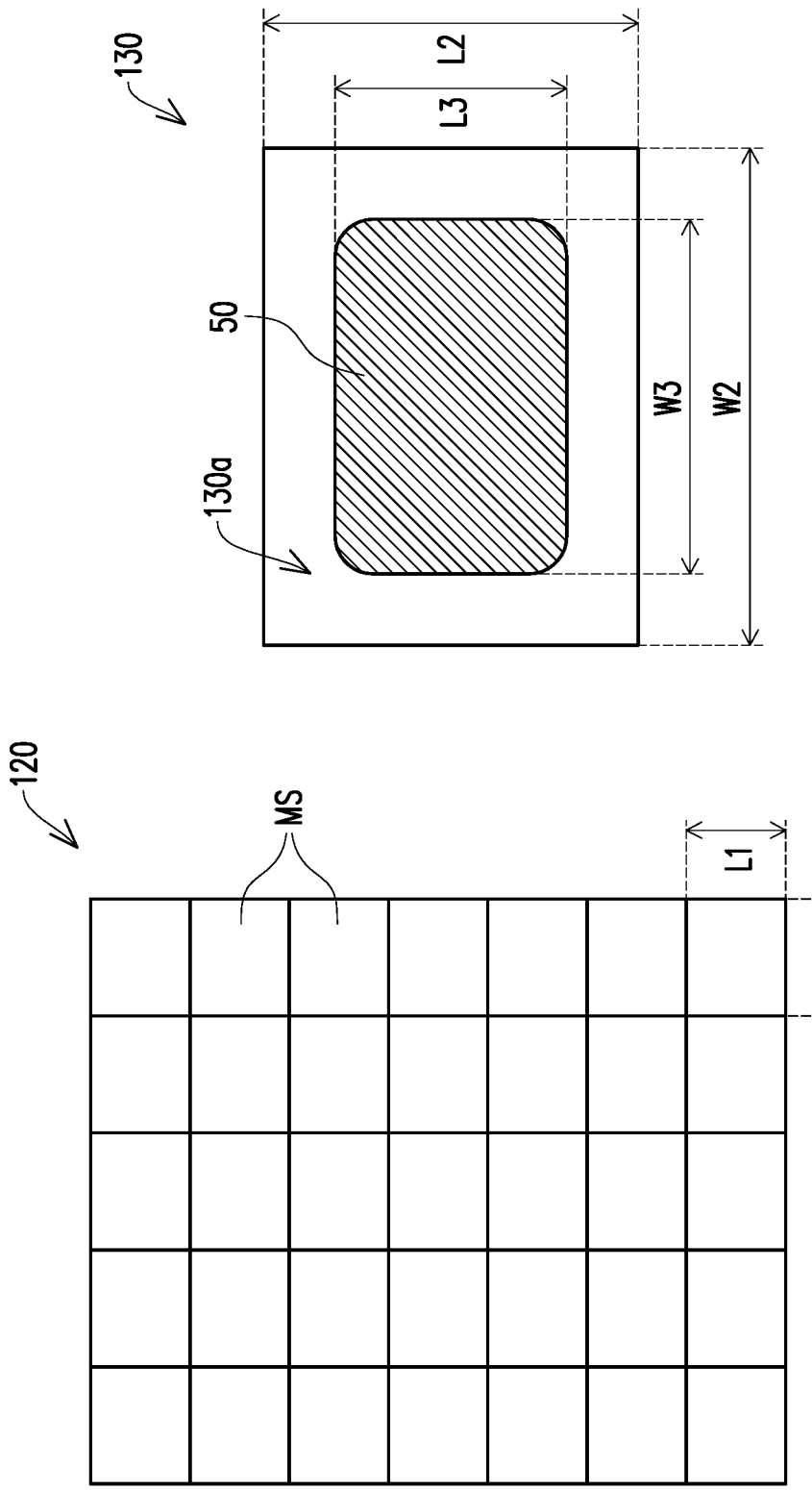
FIG. 2 is a front view of a light spot shaping element of FIG. 1.
FIG. 3 is a front view of a light uniforming element of FIG. 1.

FIG. 1 is a schematic diagram of a projection apparatus according to a first embodiment of the invention. FIG. 2 is a front view of a light spot shaping element of FIG. 1. FIG. 3 is a front view of a light uniforming element of FIG. 1. Referring to FIG. 1, the projection apparatus 200 of the embodiment includes an illumination system 100, a light valve 210 and a projection lens 220. The illumination system 100 is configured to emit an illumination beam IB. The light valve 210 is disposed on a transmission path of the illumination beam IB to convert the illumination beam IB into an image beam IMB. The projection lens 220 is disposed on a transmission path of the image beam IMB, and projects the image beam onto a screen or a wall (not shown) to form an image. Since after the illumination beam IB with different colors irradiates the light valve 210 in a time sequence, the light valve 210 converts the illumination beam IB of different colors into the image beam IMB in the time sequence and transmits the image beam IMB to the projection lens 220. Therefore, an image of the image beam IMB converted by the light valve 210 and projected out of the projection apparatus 200 may be a color image.

In the embodiment, the light valve 210 is, for example, a Digital Micro-mirror Device (DMD), or a Liquid-Crystal-On-Silicon (LCOS) panel. However, in other embodiments, the light valve 210 may be a transmissive liquid crystal panel or other spatial light modulator. In the embodiment, the number of the light valves 210 may be one or plural, and enough instructions and recommendations for detailed steps and implementations corresponding to different numbers of the light valves 210 may be learned from ordinary knowledge of the technical field, and details thereof are not repeated.

In the embodiment, the projection lens 220 is, for example, one or a combination of a plurality of optical lenses with refractive powers, and the optical lens, for example, includes a non-flat lens such as a biconcave lens, a biconvex lens, a concavo-convex lens, a convexo-concave lens, a plano-convex lens, a plano-concave lens, etc, or various combinations thereof. The form and type of the projection lens 220 are not limited by the invention.

Referring to FIG. 1, FIG. 2 and FIG. 3, the illumination system 100 of the embodiment includes at least one laser light source (in FIG. 1, three laser light sources 110a, 110b and 110c are taken as an example for description), at least one light spot shaping element 120 and a light uniforming element 130. The laser light source 110a is configured to emit a laser beam EB1. The laser light source 110b is configured to emit a laser beam EB2. The laser light source 110c is configured to emit a laser beam EB3. The laser beam EB1, the laser beam EB2 and the laser beam EB3 may respectively have different wavelengths. In the embodiment, the laser light source 110a, the laser light source 110b and the laser light source 110c are broadly referred to as light sources capable of emitting light beams with specific wavelengths, and peak wavelengths of the light beams with specific wavelengths, for example, respectively fall within wavelength ranges of blue light, red light and green light, where the peak wavelength is defined as a wavelength corresponding to the maximum light intensity. In the embodiment, the laser light source 110a, the laser light source 110b and the laser light source 110c are laser light-emitting elements including laser diodes. For example, the laser light source 110a is, for example, a blue laser diode array (or blue laser diode bank), and the laser beam EB1 is a blue laser beam. The laser light source 110b is, for example, a red laser diode array, and the laser beam EB2 is a red laser beam. The laser light source 110c is, for example, a green laser diode array, and the laser beam EB3 is a green laser beam, but the invention does not limit placement positions of the laser diode arrays.

In the embodiment, the at least one light spot shaping element 120 is disposed on transmission paths of the laser beam EB1, the laser beam EB2 and the laser beam EB3. The at least one light spot shaping element 120 is, for example, a lens array, and at least one surface of the light spot shaping element 120 has a plurality of microstructures MS, where a shape of an orthogonal projection of each one of the microstructures MS on a reference plane perpendicular to an optical axis of the at least one light spot shaping element 120 is a rectangle, where the optical axis of the at least one light spot shaping element 120 is parallel to the laser beam EB3. It should be noted that the microstructures MS in FIG. 2 has an ideal shape, which has a tolerance in actual manufacturing, and each angle thereof is not a right angle. The light uniforming element 130 is disposed on the transmission paths of the laser beam EB1, the laser beam EB2 and the laser beam EB3, and the light uniforming element 130 has a rectangular light entering end 130a, where an aspect ratio of each one of the microstructures MS of the at least one light spot shaping element 120 corresponds to an aspect ratio of the rectangular light entering end 130a of the light uniforming element 130. In the embodiment, the light uniforming element 130 is configured to uniform the laser beam EB1, the laser beam EB2 and the laser beam EB3 to form an illumination beam IB for outputting, and the light uniforming element 130 is, for example, an integration rod. The light uniforming element 130 further has a rectangular light emitting end 130b, where shapes and sizes of the rectangular light emitting end 130b and the rectangular light entering end 130a are substantially the same, but in other embodiments, sizes of the rectangular light emitting end 130b and the rectangular light entering end 130a may be different but shapes thereof are substantially the same.

To be specific, after the laser beam EB1, the laser beam EB2 and the laser beam EB3 pass through the at least one light spot shaping element 120, a shape of a light spot 50 (shown in FIG. 3) formed by the laser beam EB1, the laser beam EB2 and the laser beam EB3 on the rectangular light entering end 130a of the light uniforming element 130 is substantially close to the shape of the microstructures MS of the light spot shaping element 120. Therefore, when the aspect ratio of the microstructures MS of the light spot shaping element 120 is close to the aspect ratio of the rectangular light entering end 130a of the light uniforming element 130, the shape of the light spot 50 may be close to the shape of the rectangular light entering end 130a of the light uniforming element 130 through the light spot shaping element 120, such that a forming range of the light spot 50 is within an area range of the rectangular light entering end 130a.

Namely, by the configuration of the light spot shaping element 120, the shape of the light spot 50 formed by the laser beam EB1, the laser beam EB2 and the laser beam EB3 may correspond to the shape of the rectangular light entering end 130a of the light uniforming element 130, so as to improve shape matching between the light spot 50 and the rectangular light entering end 130a, which may improve light collecting efficiency and reduce the loss of light efficiency. Therefore, the illumination system 100 and the projection apparatus 200 of the embodiment of the invention have better optical efficiency.

As shown in FIG. 2 and FIG. 3, each one of the microstructures MS of the light spot shaping element 120 may have a length L1 and a width W1, the rectangular light entering end 130a of the light uniforming element 130 may have a length L2 and a width W2, and the light spot 50 may have a length L3 and a width W3, where the aspect ratio (i.e. length L1/width W1) of the microstructure MS of the light spot shaping element 120, the aspect ratio (i.e. length L2/width W2) of the rectangular light entering end 130a of the light uniforming element 130 and the aspect ratio (i.e. length L3/width W3) of the light spot 50 correspond to each other, and the length L3 and the width W3 of the light spot 50 are respectively smaller than the length L2 and the width W2 of the rectangular light entering end 130a of the light uniforming element 130. In the embodiment, a proportion of the aspect ratio (i.e. length L1/width W1) of the microstructure MS of the light spot shaping element 120 to the aspect ratio (i.e. length L2/width W2) of the rectangular light entering end 130a of the light uniforming element 130 is greater than or equal to 0.75, and smaller than or equal to 1.33, but the invention is not limited thereto.

It should be noted that in order to achieve the optimal optical efficiency of the projection apparatus 200, an aspect ratio of the rectangular light emitting end 130b (or the rectangular light entering end 130a) of the light uniforming element 130 is required to be close to an aspect ratio of an effective area of the light valve 210, such that a light spot formed by the illumination beam IB on the light valve 210 may completely cover the effective area of the light valve 210, and the part of the light spot exceeding the effective area is reduced as far as possible (i.e. a forming range of the light spot of the illumination beam IB on the light valve 210 is only slightly greater than the effective area of the light valve 210). The effective area of the light valve 210 refers to an optical active operating area used to convert the illumination beam IB into the image beam IMB for transmitting to the projection lens 220. The optical active operating area is, for example, a digital micro-mirror region of a DMD, but the invention is not limited thereto. For example, the aspect ratio of the effective area of the light valve 210 is, for example, 4:3(1.333) or 16:9(1.777), so that the aspect ratio of the rectangular light emitting end 130b (or the rectangular light entering end 130a) of the light uniforming element 130 is required to be close to 4:3(1.333) or 16:9 (1.777), but the invention is not limited thereto.

Moreover, it should be noted that when a size of the microstructure MS of the light spot shaping element 120 is small enough, the light spot shaping element 120 may also be regarded as a diffusion element with diffusion microstructures, which has an effect of reducing or eliminating a speckle phenomenon of the laser beam. Since the light uniforming element 130 also has a function of uniforming the laser beam, a density of the microstructures MS of the light spot shaping element 120 does not need to be high, so as to achieve lower cost. Moreover, by using the light spot shaping element 120 to shape the light spot of the laser beam, an E'tendue of the laser beam may also be adjusted, so as to achieve higher design flexibility.

FIG. 4A to FIG. 4D are cross-sectional views of light spot shaping elements according to some embodiments of the invention. The light spot shaping element 120 of FIG. 1 may be each one of the light spot shaping element 120a to the light spot shaping element 120d of FIG. 4A to FIG. 4D. Referring to FIG. 4A to FIG. 4D, at least one surface of each one of the light spot shaping element 120a to the light spot shaping element 120d has a plurality of microstructures MS. For example, as shown in FIG. 4A, the light spot shaping element 120a may be a single lens array, and two surfaces of the light spot shaping element 120a respectively have a plurality of microstructures MS, where each of the microstructures MS has a curved-surface shape. As shown in FIG. 4B, the light spot shaping element 120b may be a single lens array, and one surface of the light spot shaping element 120b has a plurality of microstructures MS, and another surface is a plane S1. As shown in FIG. 4C, the light spot shaping element 120c may be a fly-eye lens having a pair of lens arrays, and one surface of each one of the pair of lens arrays has a plurality of microstructures MS, and another surface thereof is a plane S2. As shown in FIG. 4D, the light spot shaping element 120d may be a single lens array, and one surface of the light spot shaping element 120d has a plurality of microstructures MS, and another surface thereof is a spherical or aspherical surface S3. In the embodiment, a light incident surface may be each one of the surfaces of the light spot shaping element, which is not limited by the invention.

Referring to FIG. 1 again, the illumination system 100 may further include a light combined module 140. The light spot shaping element 120 is located between the light combined module 140 and the light uniforming element 130. The light combined module 140 is disposed on the transmission paths of the laser beam EB1, the laser beam EB2 and the laser beam EB3, and is configured to combine the laser beam EB1, the laser beam EB2 and the laser beam EB3. To be specific, in the embodiment, the light combined module 140 may include a Dichroic Mirror (DM) 142 and a DM 144, which are adapted to provide different optical effects (for example, reflection or penetration) to wavelength beams of different colors. For example, in the embodiment, the DM 142, for example, allows the laser beam EB1 and the laser beam EB3 to penetrate through and reflects the laser beam EB2, and the DM 144, for example, allows the laser beam EB2 and the laser beam EB3 to penetrate through and reflects the laser beam EB1. Therefore, the light combined module 140 may combine the laser beam EB1, the laser beam EB2 and the laser beam EB3 respectively coming from the laser light source 110a, the laser light source 110b and the laser light source 110c for transmitting to the light spot shaping element 120. Moreover, in other embodiments, the light combined module 140 may be a dichroic prism group.

In the embodiment, the projection apparatus 200 may further include one or a plurality of optical elements used for adjusting light beam transmission. For example, a lens C1 located between the light combined module 140 and the light uniforming element 130, an optical lens group 230 located between the light valve 210 and the projection lens 220 or a reflection mirror 240 used for transmitting the illumination beam IB to the optical lens group 230, etc.

It should be noted that the following embodiment adopts a part of content of the aforementioned embodiment, and description of the same technical content is omitted, where the same component name may refer to a part of content of the aforementioned embodiment, and description thereof is omitted.

Figure 5:
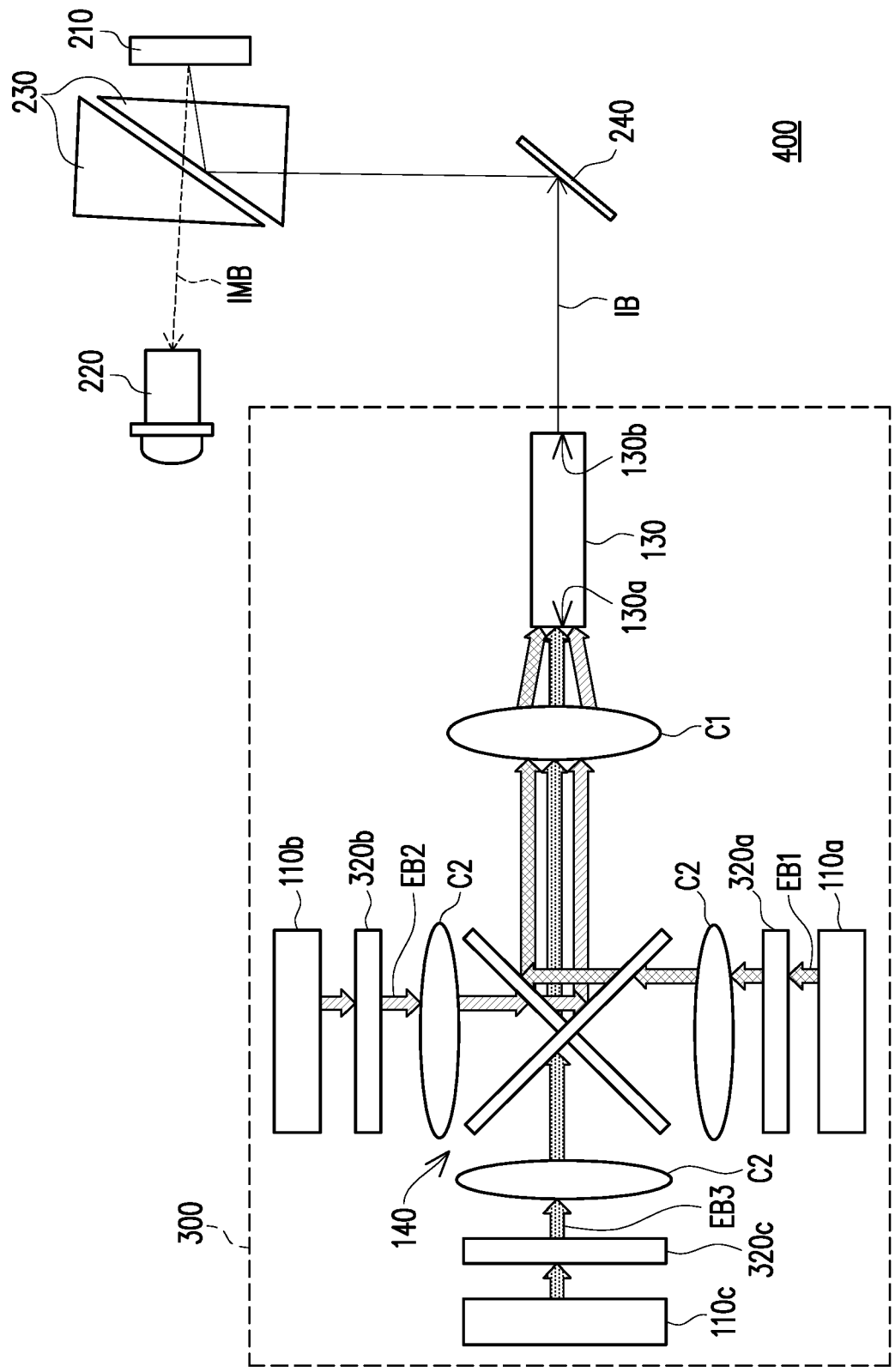
FIG. 5 is a schematic diagram of a projection apparatus according to a second embodiment of the invention.

FIG. 5 is a schematic diagram of a projection apparatus according to a second embodiment of the invention. Referring to FIG. 5, the projection apparatus 400 of the embodiment is substantially similar to the projection apparatus 200 of FIG. 1, and a main difference there between lies in the number and configuration positions of the light spot shaping elements. In the embodiment, the number of the light spot shaping elements of the illumination system 300 is consistent with the number of the plurality of laser light sources, and each of the plurality of light spot shaping elements is disposed between a corresponding one of the laser light sources and the light combined module 140. To be specific, the number of the laser light sources of the embodiment is three, so that the illumination system 300 may have three light spot shaping elements, for example, a light spot shaping element 320a, a light spot shaping element 320b and a light spot shaping element 320c of FIG. 5. The light spot shaping element 320a is disposed between the laser light source 110a and the light combined module 140, the light spot shaping element 320b is disposed between the laser light source 110b and the light combined module 140, and the light spot shaping element 320c is disposed between the laser light source 110c and the light combined module 140. Namely, the laser light sources of the embodiment respectively have the exclusive light spot shaping elements to respectively adjust the respective light spot shapes of the laser beam EB1, the laser beam EB2 and the laser beam EB3, where the proper adjustment may be performed according to sizes or light spot aspect ratios of different laser light sources, so as to increase design flexibility. Moreover, lenses C2 may be respectively between the respective laser light sources and the light combined module 140 to adjust light spot sizes of the light beams.

Figure 6:
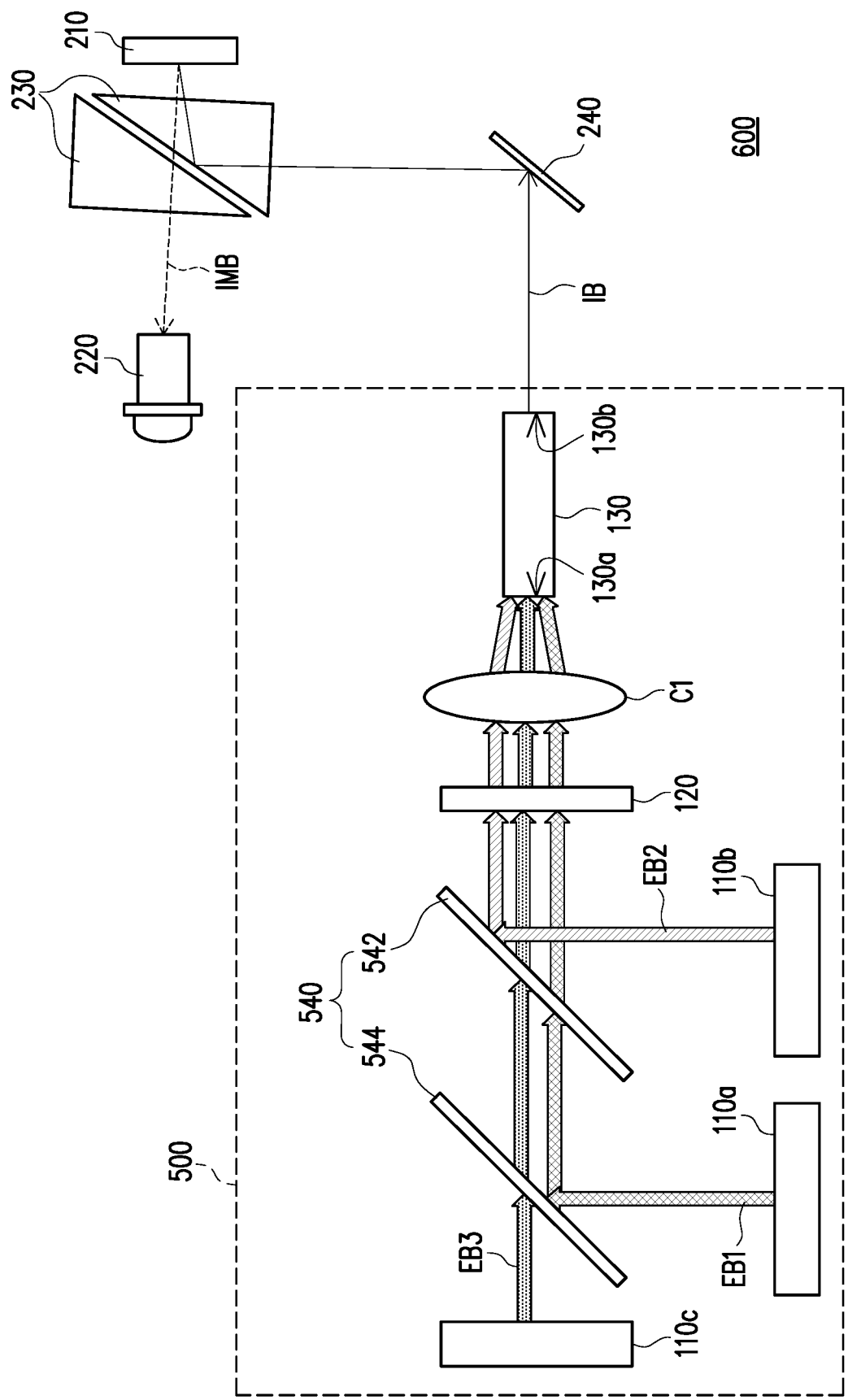
FIG. 6 is a schematic diagram of a projection apparatus according to a third embodiment of the invention.

FIG. 6 is a schematic diagram of a projection apparatus according to a third embodiment of the invention. Referring to FIG. 6, the projection apparatus 600 of the embodiment is substantially similar to the projection apparatus 200 of FIG. 1, and a main difference there between lies in a configuration method of the light combined module and the laser light sources. In the embodiment, a DM 542 and a DM 544 of a light combined module 540 of the illumination system 500 are independent elements, where the DM 542 is located on the transmission paths of the laser beam EB1, the laser beam EB2 and the laser beam EB3, and the DM 544 is located on the transmission paths of the laser beam EB1 and the laser beam EB3. In the embodiment, the DM 542, for example, allows the laser beam EB1 and the laser beam EB3 to penetrate through and reflects the laser beam EB2, and the DM 544, for example, allows the laser beam EB3 to penetrate through and reflects the laser beam EB1. Therefore, the DM 544 may combine the laser beam EB1 coming from the laser light source 110a and the laser beam EB3 coming from the laser light source 110c for transmitting to the DM 542, and the DM 542 may combine the laser beam EB1 and the laser beam EB3 coming from the DM 544 and the laser beam EB2 coming from the laser light source 110b. Moreover, in other embodiments, the light combined module 540 may be two independent dichroic prisms.

Moreover, in other embodiments, the number and configuration positions of the light spot shaping elements of the illumination system 500 may be the same as the number and configuration positions of the light spot shaping elements of the second embodiment. Namely, the illumination system 500 may have three light spot shaping elements, and the light spot shaping elements are respectively disposed between the laser light source 110a and the DM 544, between the laser light source 110b and the DM 542 and between the laser light source 110c and the DM 544 to respectively adjust the light spot shapes of the laser beam EB1, the laser beam EB2 and the laser beam EB3.

In summary, in the illumination system and the projection apparatus of the invention, since the shape of the orthogonal projection of each one of the microstructures of the at least one light spot shaping element on the reference plane perpendicular to the optical axis of the at least one light spot shaping element is a rectangle, and the aspect ratio of each one of the microstructures of the at least one light spot shaping element corresponds to the aspect ratio of the rectangular light entering end of the light uniforming element, the at least one light spot shaping element may be used to make a light spot shape of the at least one laser beam correspond to a shape of the rectangular light entering end of the light uniforming element, so as to improve shape matching between the light spot and the rectangular light entering end, which may improve light collecting efficiency and reduce the loss of light efficiency. Therefore, the illumination system and the projection apparatus of the embodiments of the invention have better optical efficiency.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, comprising:
   at least one laser light source, configured to emit at least one laser beam;
   at least one light spot shaping element, disposed on a transmission path of the at least one laser beam, wherein at least one surface of the at least one light spot shaping element has a plurality of microstructures, and a shape of an orthogonal projection of each one of the microstructures on a reference plane perpendicular to an optical axis of the at least one light spot shaping element is a rectangle; and
   a light uniforming element, disposed on the transmission path of the at least one laser beam, and the light uniforming element having a rectangular light entering end, wherein an aspect ratio of each one of the microstructures of the at least one light spot shaping element corresponds to an aspect ratio of the rectangular light entering end of the light uniforming element,
   wherein a number of the at least one laser light source is plural, and the plurality of laser light sources are configured to emit a plurality of laser beams,
   wherein the illumination system further comprises a light combined module, and the light combined module is configured to combine the plurality of laser beams to form combined laser beams, and wherein the light uniforming element is configured to receive the combined laser beams without being modulated from the plurality of laser light sources,
   wherein a number of the at least one light spot shaping element is consistent with the number of the plurality of laser light sources, and each of the plurality of light spot shaping elements is disposed between a corresponding one of the plurality of laser light sources and the light combined module, and the light combined module is disposed between the plurality of light spot shaping elements and the light uniforming element on the transmission paths of the at least one laser beams.

2. The illumination system of claim 1, wherein a proportion of the aspect ratio of each one of the microstructures to the aspect ratio of the rectangular light entering end is greater than or equal to 0.75, and smaller than or equal to 1.33.

3. The illumination system of claim 1, wherein after the at least one laser beam passes through the at least one light spot shaping element, the at least one laser beam forms a light spot on the rectangular light entering end of the light uniforming element, and a forming range of the slight spot is within an area range of the rectangular light entering end.

4. The illumination system of claim 1, wherein the plurality of laser beams respectively have different wavelengths.

5. The illumination system of claim 1, wherein the at least one light spot shaping element comprises a lens array.

6. The illumination system of claim 1, wherein one surface of the at least one light spot shaping element is a plane.

7. The illumination system of claim 1, wherein one surface of the at least one light spot shaping element is a spherical surface or aspherical surface.

8. A projection apparatus, comprising:
   an illumination system, configured to emit an illumination beam, and comprising:
   at least one laser light source, configured to emit at least one laser beam;
   at least one light spot shaping element, disposed on a transmission path of the at least one laser beam, wherein at least one surface of the at least one light spot shaping element has a plurality of microstructures, and a shape of an orthogonal projection of each one of the microstructures on a reference plane perpendicular to an optical axis of the at least one light spot shaping element is a rectangle; and
   a light uniforming element, disposed on the transmission path of the at least one laser beam, and the light uniforming element having a rectangular light entering end, wherein an aspect ratio of each one of the microstructures of the at least one light spot shaping element corresponds to an aspect ratio of the rectangular light entering end of the light uniforming element;
   a light valve, disposed on a transmission path of the illumination beam to convert the illumination beam into an image beam; and
   a projection lens, disposed on a transmission path of the image beam,
   wherein a number of the at least one laser light source is plural, and the plurality of laser light sources are configured to emit a plurality of laser beams, wherein the illumination system further comprises a light combined module, and the light combined module is configured to combine the plurality of laser beams,
   wherein a number of the at least one light spot shaping element is consistent with the number of the plurality of laser light sources, and each of the plurality of light spot shaping elements is disposed between a corresponding one of the plurality of laser light sources and the light combined module, and the light combined module is disposed between the plurality of light spot shaping elements and the light uniforming element on the transmission paths of the at least one laser beams, and wherein the light uniforming element is disposed between the light valve and the light combined module.

9. The projection apparatus of claim 8, wherein a proportion of the aspect ratio of each one of the microstructures to the aspect ratio of the rectangular light entering end is greater than or equal to 0.75, and smaller than or equal to 1.33.

10. The projection apparatus of claim 8, wherein after the at least one laser beam passes through the at least one light spot shaping element, the at least one laser beam forms a light spot on the rectangular light entering end of the light uniforming element, and a forming range of the slight spot is within an area range of the rectangular light entering end.

11. The projection apparatus of claim 8, wherein the plurality of laser beams respectively have different wavelengths.

12. The projection apparatus of claim 8, wherein the at least one light spot shaping element comprises a lens array.

13. The projection apparatus of claim 8, wherein one surface of the at least one light spot shaping element is a plane.

14. The projection apparatus of claim 8, wherein one surface of the at least one light spot shaping element is a spherical surface or aspherical surface.

* * * * *